Aug. 16, 1927.
V. J. O'BRIEN
1,639,102
JOINT FOR PISTON AND CONNECTING ROD MOUNTINGS
Filed July 25, 1922
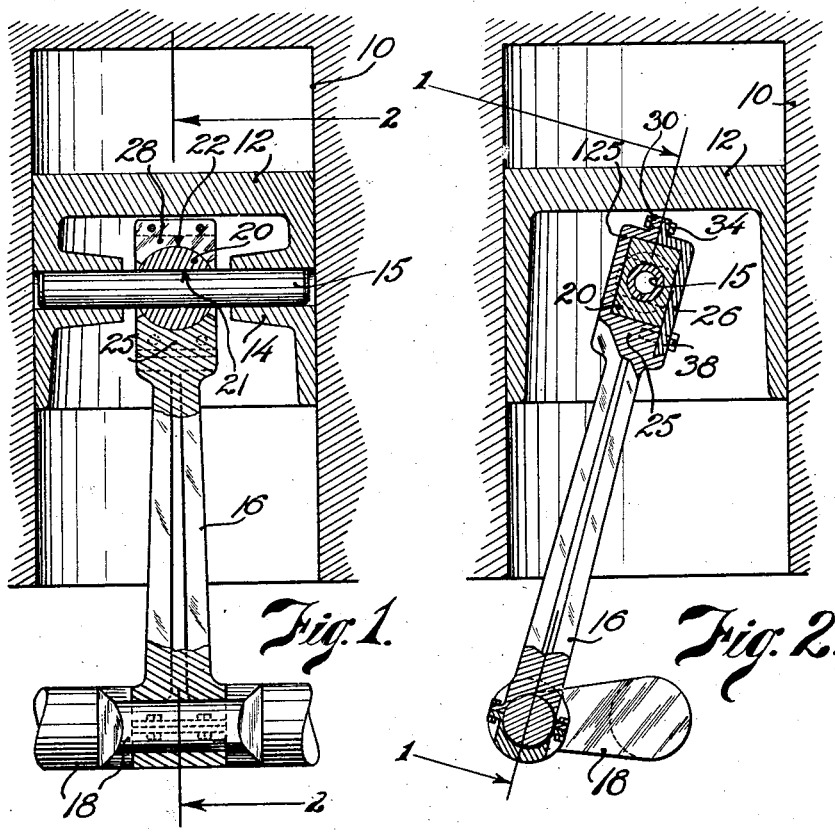
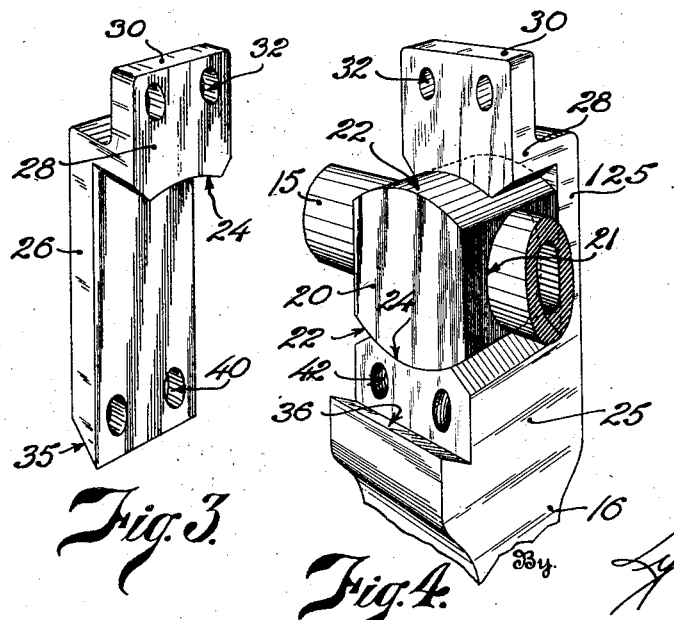
Inventor
V. J. O'Brien.

Patented Aug. 16, 1927.

1,639,102

UNITED STATES PATENT OFFICE.

VINCENT JOHN O'BRIEN, OF SMUGGLER, COLORADO, ASSIGNOR OF ONE-HALF TO EDWARD H. SACKETT, OF ARVADA, COLORADO.

JOINT FOR PISTON AND CONNECTING-ROD MOUNTINGS.

Application filed July 25, 1922. Serial No. 577,422.

The object of this invention is to provide such a joint between the connecting rod and piston in an internal combustion engine as will care not only for the movements of the crank shaft when rotating but will also care for any variation in alinement of the bearings of the shaft, and thereby eliminate binding of the piston and scoring of the cylinder thereby when the bearings are not true.

Briefly the invention resides in providing such a joint between the connecting rod and piston as will care for relative movements in all directions, this joint being one style of universal joint particularly adapted to this special use.

In the accompanying drawings wherein one embodiment of the invention is disclosed by way of illustration, Fig. 1 is a vertical section through cylinder, piston and joint taken on the line 1—1 of Fig. 2;

Fig. 2 is a similar vertical section taken on line 2—2 of Fig. 1;

Fig. 3 is a perspective view of the cap plate or retaining plate which is secured to the connecting rod;

Fig. 4 is a perspective view of the upper end of the connecting rod and the joint parts with the cap plate of Fig. 3 removed.

The drawings indicate the usual cylinder block 10 of an explosive engine in which the piston 12 reciprocates. The piston carries the ordinary bosses or bearings 14 for the wrist pin 15 whereby the connecting rod 16 is attached, the rod 16 being operated by the crank shaft 18 as usual.

The joint comprises a bearing block 20 provided with an axial bore 21 which receives the wrist pin 15. The side and end faces of this block may be flat as shown, but the upper and lower faces 22 thereof are curved as shown to provide bearing faces which engage and cooperate with similarly curved faces 24 on the head 25 of the connecting rod and on the cap plate or retaining plate 26 which is secured to said head. Head 25 carries an upstanding wall 125 which engages one end of block 20 and is disposed opposite plate 26 which engages the other end of block 20. Both the plate 26 and the end wall or arm 125 are provided with overhanging ledges or shoulders 28 which carry the upper engaging or bearing faces 24, the lower face 24 being carried as shown entirely by the head 25. Upstanding ears 30 on the shoulders 28 are provided with bolt holes 32 for receiving retaining bolts 34 passed therethrough to secure cap plate 26 upon the head 25. The lower end of plate 26 is beveled at 35 for engagement with a correspondingly beveled face 36 on head 25, whereby the lower end of plate 26 is firmly seated. However, if desired, machine screws 38 may be employed to positively secure said lower end, these screws being passed through holes in the end of the plate and threaded into screw holes 42 in the head 25.

In operation, the normal movements of the connecting rod will be permitted by reason of the wrist pin 15 as heretofore. But if the crank shaft should become slightly disalined as by reason of wearing down of the bearings or otherwise, the head 25 will swing upon the block 20 by reason of the faces and bearings 22 and 24, thus preventing twisting of the piston and the scoring which heretofore has always resulted under these conditions.

As a result, the piston and cylinders remain in perfect condition for much longer periods and the operation of the engine is much improved.

I claim:

1. In combination, a piston having a wrist pin therein, a block mounted upon said pin and having end faces and part-cylindrical bearing faces, a connecting rod having a head provided with bearing faces engaging the faces of the block and having an end wall engaging one end of the block, and a cap plate engaging the other end of the block and secured to said head.

2. In combination, a piston having a wrist pin therein, a block mounted upon said pin and having end walls and upper and lower bearing faces, a connecting rod having a head provided with an end wall engaging one end of the block and with bearing faces engaging the faces of the block, and a cap plate engaging the other end of the block and having its upper end bolted to the head while its lower end is beveled, the head having a beveled pocket receiving said lower beveled end and in which pocket said end fits.

In testimony whereof I affix my signature.

VINCENT JOHN O'BRIEN.